Sept. 29, 1970  A. T. PARRELLA ET AL  3,530,619
GRINDING MACHINE
Filed Sept. 18, 1967  5 Sheets-Sheet 1
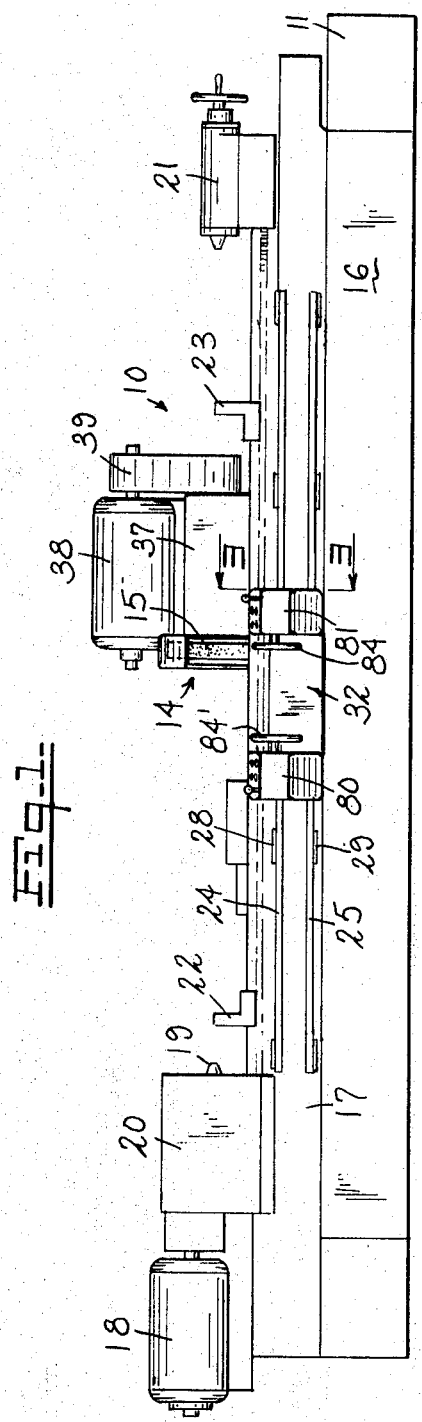
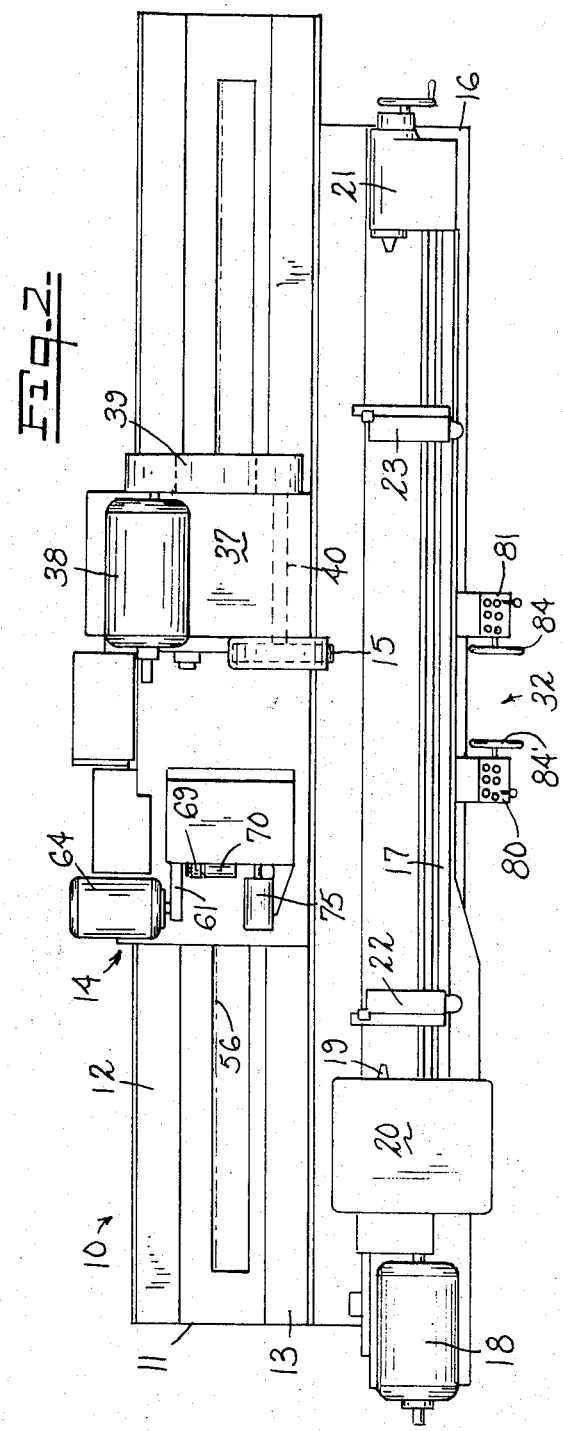
INVENTORS
Alfred T. Parrella
John C. Hinchcliffe
BY Dedio and Montgomery
ATTORNEYS

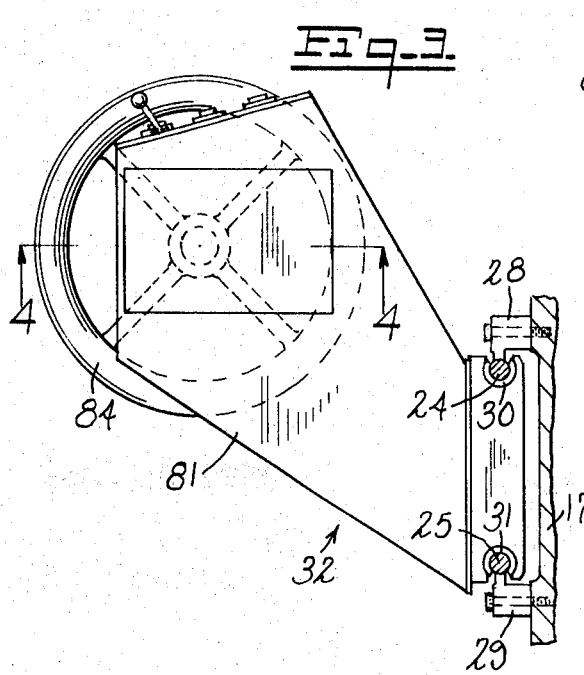
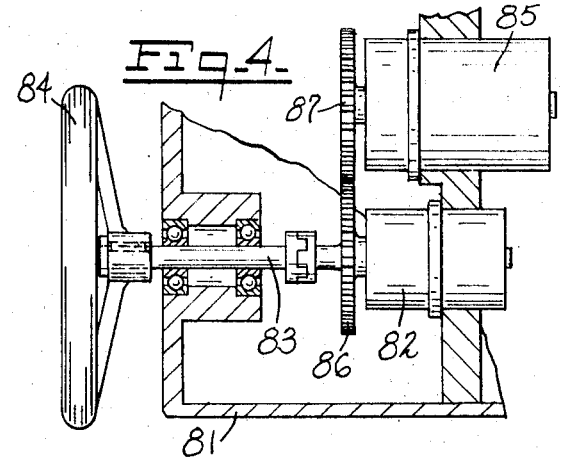
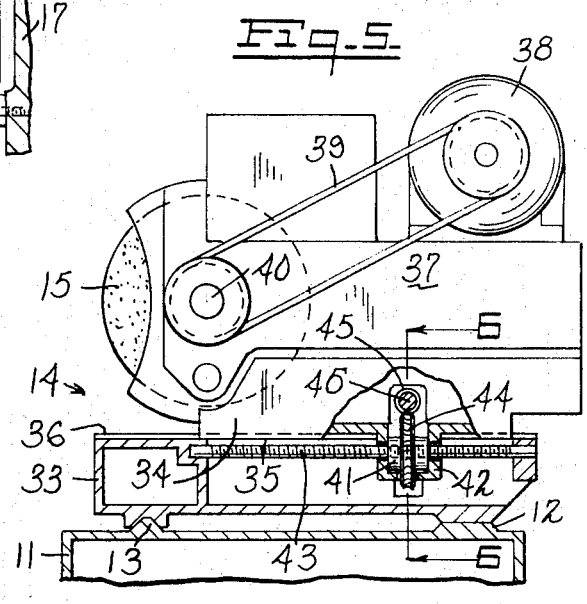

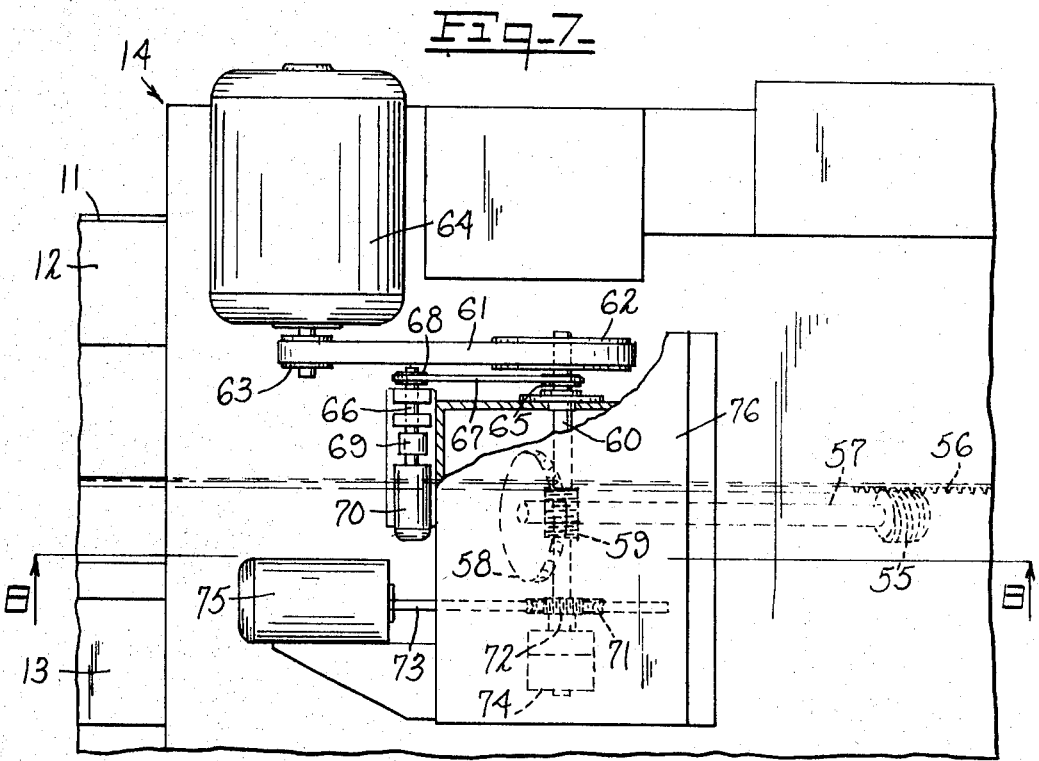
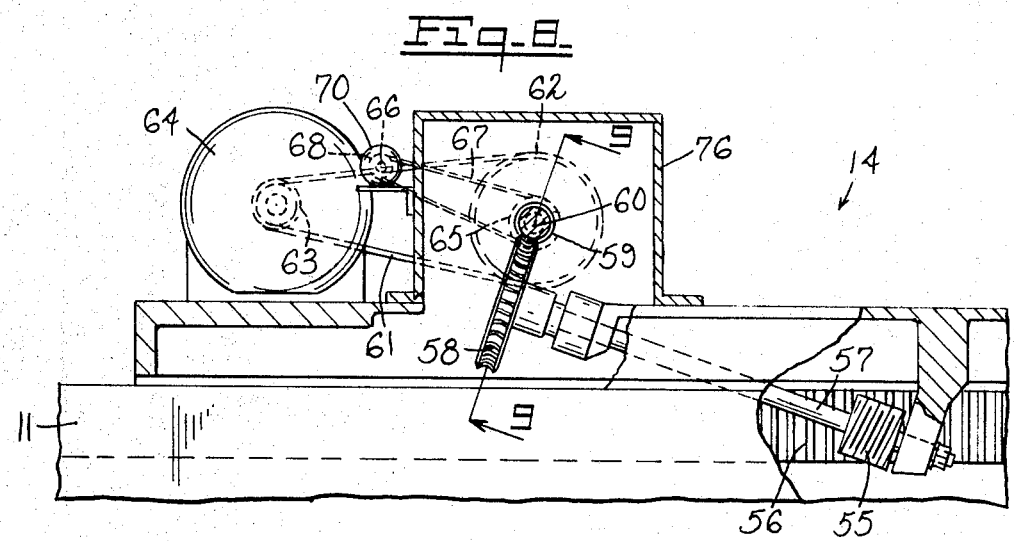

INVENTORS
Alfred T. Parrella
John C. Hinchcliffe
BY
DeLio and Montgomery
ATTORNEYS

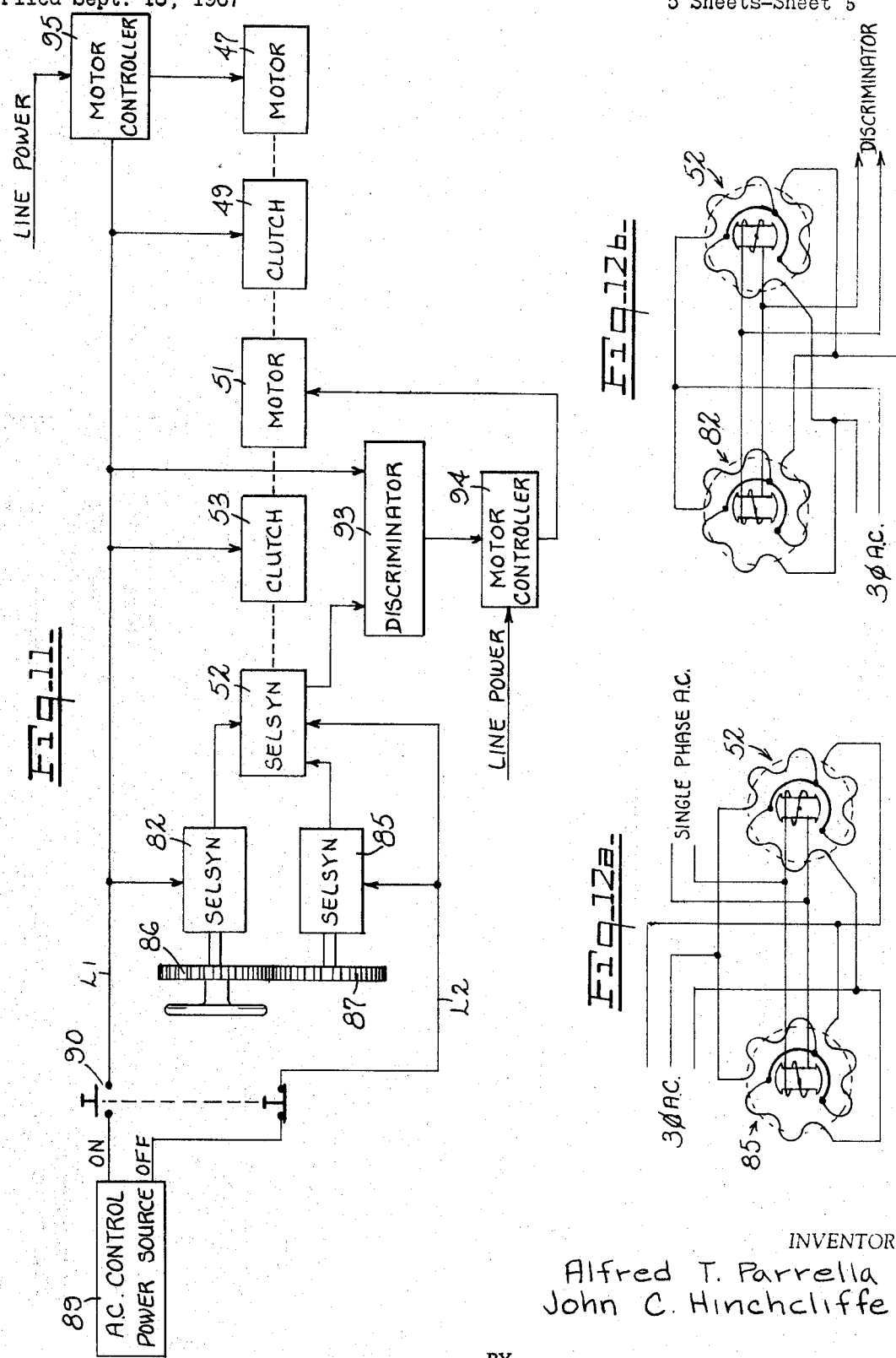

United States Patent Office 3,530,619
Patented Sept. 29, 1970

3,530,619
GRINDING MACHINE
Alfred T. Parrella, Newtown, and John C. Hinchcliffe, Cheshire, Conn., assignors to Farrel Corporation, Ansonia, Conn.
Filed Sept. 18, 1967, Ser. No. 668,479
Int. Cl. B24b 5/00, 49/00
U.S. Cl. 51—165                                   17 Claims

ABSTRACT OF THE DISCLOSURE

This disclosure relates to a grinding machine wherein operator infeed and end feed controls are movably mounted to the bed of the machine for movement along the bed to allow the operator to take a position at the point of grinding and control the feeds while at such point. The disclosure further relates to new feed controls which comprise an error selsyn which in one mode of operation yields a signal indicative of a selected feed distance selected by a control selsyn, and which in another mode of operation acts as a follower on a monitoring selsyn, geared to the control selsyn so that the error selsyn is normally in a predetermined angular relationship with the control selsyn.

---

This invention relates to roll grinders, and more particularly relates to a new and improved roll grinder and controls therefor for accomplishing certain grinding procedures.

Roll grinders of the type to which this invention relates may primarily be used by roll manufacturers for initially grinding a new roll, after casting thereof, to predetermined dimensions.

Roll grinders of this type are designed to grind a roll to specific dimensions for initial application, rather than to grind or regrind a worn roll for cleanup and reuse purposes. Previously, machines intended for initial grinding have been of the traveling table type wherein the table or bed upon which the rolls are mounted travels past a grinding wheel in a fixed position. The traveling type of table or grinder presents rigidity problems in view of the distance that it must travel and, further, requires a great deal of floor space for the travel of the table.

The present invention provides a new and improved grinder construction which allows the operator to be present at the exact point of grinding at any time and, further, to have the necessary controls for minute infeed and end feed present at such point of grinding. This is particularly advantageous in detail grinding, such as roll necks, fillets, slots and shoulders.

In one form thereof the present invention provides operators' controls mounted on the front of the bed of the machine on slides which allow the operator to move a control console along the length of the roll so that he may be present at the exact point of grinding. Such console includes means for controlling both the infeed and longitudinal movement and new and improved control means for effecting such movement.

An object of this invention is to provide a new and improved grinding machine of the type described.

Another object of this invention is to provide a grinding machine of the type described having new and improved means for permitting operator control of infeed and end feed while at the point of grinding.

A further object of this invention is to provide new and improved control means which may be actuated or operated at any position along the length of a roll being ground.

A still further object of this invention is to provide new and improved control means for infeed and end feed of a grinding wheel on a grinding machine.

The features of the invention which are believed to be novel are set forth with particularity and distinctly claimed in the concluding portion of this specification. The invention, however, both as to its organization and operation, and together with further objects and advantages thereof may best be appreciated by reference to the following detailed description taken in conjunction with the drawings, in which:

FIG. 1 is a front elevation of a grinding machine embodying the invention;

FIG. 2 is a plan view of the machine of FIG. 1;

FIG. 3 is a view seen in the plane of lines 3—3 of FIG. 1, and further illustrating the slidable mounting of a control console on the bed of the grinding machine;

FIG. 4 is a view seen in the plane of lines 4—4 of FIG. 3;

FIG. 5 is a view, partially in section, of the grinding wheel carriage of the machine of FIGS. 1 and 2;

FIG. 6 is a view in section in the plane of lines 6—6 of FIG. 5 showing the carriage infeed drive mechanism;

FIG. 7 is an enlarged plan view, partially in section, of the carriage drive;

FIG. 8 is a view seen in the plane of lines 8—8 of FIG. 7;

FIG. 11 is a diagram in block form of the controls for infeed and end feed of the grinding wheel;

FIGS. 12a and 12b are schematic diagrams showing the relation of positioning and error selsyns therein.

Figure 9:
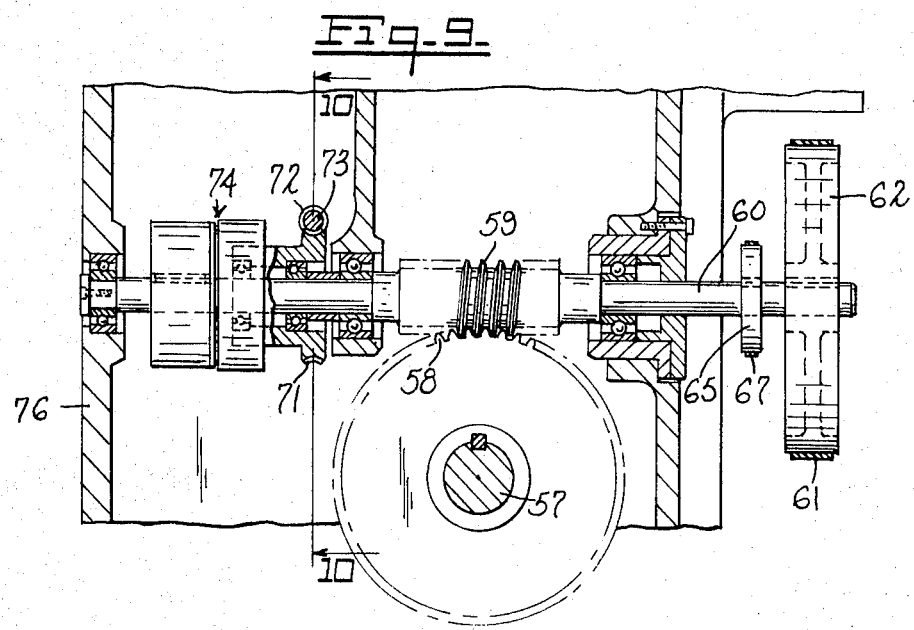
FIG. 9 is a view seen in the plane of lines 9—9 of FIG. 8.

A machine embodying the invention is generally indicated by the reference numeral 10 and comprises a bed 11 having ways 12 and 13 thereon which guide movement of a grinding wheel carriage 14 along the length of bed 11. Carried on carriage 14 is a grinding wheel 15 adapted to operate upon a roll. The apparatus further includes a bed 16 having a front wall 17. Mounted to bed 16 is a driving motor 18 adapted to rotate a headstock 19 through suitable gearing within a housing 20. Longitudinally movable along bed 16 is a footstock 21 and also neck rests 22 and 23. A roll to be ground may either be mounted on centers between headstock 19 and footstock 21 or have its necks mounted on neck rests 22 and 23 and then suitably coupled to headstock 19 for rotation. Such choice will be determined by the size of the roll, the larger roll being mounted for rotation on the neck rests.

Mounted in fixed relation to front wall 17 are parallel guide rods 24 and 25 which are supported in parallel spaced relation brackets 28 and 29 affixed to bed 16.

Slidably mounted on rods 24 and 25 by means of ball bushings 30 and 31, respectively, is a control console 32, hereinafter described.

Grinding wheel carriage 14 comprises a base member 33 movable on ways 12 and 13 as more clearly shown in FIGS. 5 and 6. Mounted on base 33 for movement toward and away from a roll is a sub-base 34 movable on ways 35 and 36. Pivotally mounted to sub-base 34 is a wheel head 37. The pivotal mounting is for the purpose of very fine tilt infeed as described in U.S. Pat. Re. 25,794. Carried on wheel head 37 is a grindnig wheel motor 38 which through a belt drive 39 drives a spindle 40 to which grinding wheel 15 is mounted. Sub-base 34 is moved along ways 35 and 36 by means of a traveling nut 41 received in a housing 42 on the sub-base. Nut 41 is threadably received on a non-rotatable lead screw 43 affixed to base 33 at either end thereof. Thus upon rotation of nut 41 in housing 42, nut 41 will advance or retract on lead screw 43. Affixed to nut 41 is a worm wheel 44 driven by a worm 45 on shaft 46. Shaft 46 is driven by a motor 47 and may also be driven by a worm wheel 48 when worm wheel 48 is clutched to shaft 46 through an electrically operated clutch 49. Worm wheel 48 is driven by a worm 49a on a shaft 50 by a motor 51 for very slow speed infeed of carriage 14. Driven by motor 47 at the same speed as shaft 46 is an infeed measuring device such as a selsyn 52 which is connected to the shaft of motor 47 through an electrically operated clutch 53 and drive belt 54. Under certain conditions, as hereinafter described, selsyn 52 is clutched to the shaft of motor 47.

Carriage 14 moves along ways 12 and 13 by means of a pinion 55 which engages a rack 56 defined along the length of bed 11. Pinion 55 is driven through a shaft 57 carrying a worm wheel 58. Worm wheel 58 is driven by a worm 59 on a shaft 60 which is driven by means of a belt 61 and pulley 62, connected to a pulley 63 on the shaft of a carriage traverse motor 64. Also coupled to shaft 60 is a pulley 65 which drives shaft 66 through belt 67 and pulley 68 thereon. Shaft 66 through an electrically operated clutch 69 drives a motion sensing device such as a selsyn receiver 70.

Upon operation of motor 64, shaft 60 drives worm 59 which drives worm wheel 58 and shaft 57, and pinion 55 drives the carriage 14 along the length of bed 11. This mode of operation is utilized to traverse the grinding wheel along the face of the roll for grinding thereof or longitudinal positioning of the grinding wheel.

Figure 10:
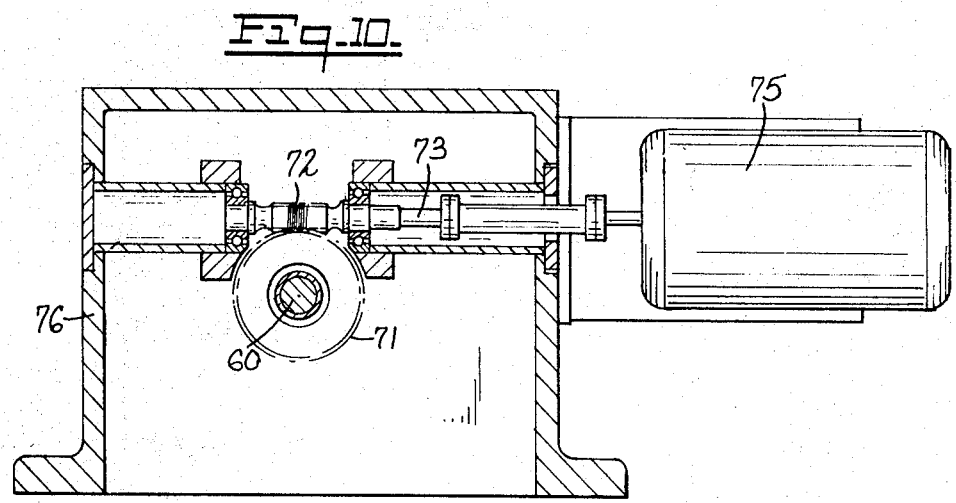
FIG. 10 is a view seen in the plane of lines 10—10 of FIG. 9.

For end feed, another longitudinal drive means is provided for carriage 14. Shaft 60 also carries thereon a worm wheel 71 which is driveable by a worm 72 on a shaft 73 (FIGS. 9 and 10). Wheel 71 may be driveably connected to shaft 60 through an electrically operated clutch 74. Shaft 73 is driven by end feed motor 75. This drive mechanism is contained within a housing 76 on carriage 14 and is utilized during end feed of grinding wheel 15 to grind shoulders, etc.

In normal operation the carriage may be advanced towards a roll to be ground either by motor 47 which is preferably a two-speed DC motor with clutch 49 disengaged to prevent back feed of worm 49a, or by tilting the wheel head 37 into the roll. Motor 47 provides fast and medium speed approach of the grinding wheel to the roll.

These modes of advancing the grinding wheel have previously been used as exemplified in the aforementioned Pat. Re. 25,794. In accordance with the invention another mode for advancing the grinding wheel towards the roll is utilized. In some cases, in finishing certain parts of the roll, the grinding wheel must be advanced by quite small but accurate amounts towards the roll as might be involved with grinding a slightly smaller diameter or roll journal, advancing the grinding wheel slightly when grinding shoulders, steps, grooves, etc. This small amount of grinding wheel advance is accomplished through the hand wheel and selsyn apparatus of FIG. 4 as further defined in the diagrams of FIGS. 11, 12a and 12b. When the selector switch 90 is open, as shown in FIG. 11, control power is applied over line L2 to selsyns 85 and 52. No signals are applied over line L1 to selsyn 82, clutches 49 and 53, or discriminator 93. Therefore, clutches 49 and 53 are de-energized and line power cannot be supplied through motor controller 94 to motor 51. The absence of a signal to motor controller 94 allows the application of line power to motor 47.

Reference is now made to console 32, slidably mounted to wall 17 which is more clearly shown in FIGS. 3 and 4. Console 32 contains two control boxes 80 and 81. Each control box contains a first selsyn 82 having a rotor coupled to a shaft 83 upon which is mounted a hand wheel 84 arranged to displace the rotor of selsyn 82. Geared to selsyn 82 for rotation therewith is a second selsyn 85. The rotors of selsyns 82 and 85 are connected by means of gears 86 and 87 which in this example are in a 1:1 ratio. This same arrangement is provided in control box 80. It may be assumed that control box 81 provides control of grinding wheel infeed and control box 80 provides control of grinding wheel end feed.

At this time, selsyn 52 acts as a follower on selsyn 85 and maintains a zero angular displacement therewith. This arrangement is shown schematically in FIG. 12a. Accordingly, the rotor of selsyn 52 always attempts to maintain zero electrical degree displacement with selsyn 85. Since selsyn 85 is directly geared to selsyn 82, selsyn 52 in following selsyn 85 will always attempt to maintain a predetermined relation with selsyn 82. Selsyns 82 and 52 are arranged so that their rotors are ninety electrical degrees apart. In this arrangement selsyn 52 and discriminator 93 act as position error detectors to detect the position error of selsyn 52 with respect to selsyn 82. This arrangement is shown schematically in FIG. 12b. The signal induced in the rotor of selsyn 52 is applied to discriminator 93 for phase comparison with the control signal from source 89.

If now switch 90 is closed, selsyn 82 is energized, clutches 49 and 53 are clutched, the control signal which acts as a phase reference is applied to discriminator 93, and any error signal from discriminator 93 is effective to allow motor controller 94 to apply line power to motor 51. At this time, motor 47 is locked out by application of a control signal to motor controller 95.

In operation, when it is desired to infeed the grinding wheel a predetermined dimension to, for example, decrease the diameter of a roll journal, the operator will slide console 32 to the desired position at the journal and close switch 90. He will then rotate hand wheel 84 a given amount to set up the desired infeed. Rotation of hand wheel 84 angularly displaces the rotor of selsyn 82. This induces a voltage in the rotor of selsyn 52 which is other than ninety degrees out of phase with the reference signal. Discriminator 93 compares the phase of the reference signal and the signal of selsyn 52 to derive an error signal indicative of the magnitude and direction of the positioin error between selsyns 82 and 52. This error signal enables motor controller 94 to energize motor 51. Motor 51 through clutch 49 drives sub-base 34 toward the commanded position and at the same time through clutch 53 returns the rotor of selsyn 52 toward a zero error position or ninety electrical degree displacement with respect to the rotor of selsyn 82.

In the arrangement shown in FIG. 12a, the stators of both of selsyns 52 and 85 receive a three-phase reference signal from source 89, and hence the phase of the stator voltages are the same. The change of phase of the signals generated in the rotor of selsyn 85 upon rotation of the rotor thereof will produce a corresponding phase relation in the rotor of selsyn 52 and cause the rotor of selsyn 52 to follow the rotor of selsyn 85 and, hence, the rotor of selsyn 82.

In the arrangement of FIG. 12b, the rotor of selsyn 52 is rotated only by motor 51. The phase of the reference voltage from line L1 is compared with the phase of the voltage induced in the rotor of selsyn 52 in discriminator 93. When this phase difference is other than ninety electrical degrees, an error signal is generated and motor 51 is operated to move sub-base 34 to eliminate the error. Simultaneously, motor 51 returns the rotor of selsyn 52 toward a zero error position.

In one embodiment of the invention, the apparatus is so arranged that one revolution of the hand wheel 84 gives .010" of sub-base movement. Then, if one revolution of the hand wheel is graduated into fifty steps, each step would give .0002" infeed.

It is to be understood that in this mode of operation selsyn 52 is not a slave or follower unit utilized for positioning purposes but is utilized to provide an error signal and the error signal then further utilized to control the operation of motor 51. For this operation of the selsyns there must always be a predetermined angular error relationship therebetween when the selsyns are used as error detectors.

However, when the positioning hand wheel is not being used, it can be understood that the selsyns 52 and 82 might assume some random relative positions and if the hand wheel were then to be utilized for advancing the grinding wheel the two selsyns 52 and 82 would not be in the required phase relationship at that time and the grinding wheel could be moved forward or backward by an amount proportional to the displaced position, regardless of whether the control hand wheel had been turned or not. This may easily be appreciated by considering that during the normal grinding operation along the face of the roll the clutches 49 and 53 are disengaged and there is no electrical synchronization between selsyns 52 and 82.

To overcome this problem, the third selsyn 85 is provided to maintain selsyn 52 in a predetermined relation with selsyn 82. Selsyns 82 and 85 are always in the same relation due to the connection of gears 86 and 87. Assume that the aforementioned infeed control system is not being utilized and switch 90 is so positioned that it is closed in line L1 and opened in line L2. Now control power is applied to both selsyns 82 and 52 and any signal generated by selsyn 85 is applied to the rotor of selsyn 52 which follows the rotor of selsyn 85 as a follower or slave unit. Because of the predetermined ninety electrical degree relationship between the rotors of selsyn 85 and selsyn 52, selsyn 85 holds selsyn 82 in such a predetermined relationship to selsyn 52 that it is always ninety electrical degrees displaced from selsyn 82 and in a ready position to act as an error detector whenever the hand wheel infeed circuit is to be utilized. Thus, even though there might be random movement of the rotors of the selsyn when the hand wheel control unit is not being utilized, it is apparent that the arrangement described will always maintain the rotor of selsyn 52 in a predetermined phase relationship with selsyn 82.

The hand wheel unit controlled by hand wheel 84 is used to control the longitudinal feed of the grinding wheel along the length of the roll. Normally when grinding the face of the roll the grinding wheel traverses back and forth across the roll face over a distance of many feet at a speed of some five to fifty inches per minute. However, when grinding shoulders, the grinding wheel is contacting the shoulders and the amount of motion along the axes of the roll may be only a few thousandths of an inch as the surface is gradually ground on the roll shoulder to the desired specified dimension. For this reason, it is necessary to provide a means in the operator's position so that the grinding wheel can be moved in a direction of the roll axes to produce these very small changes in dimensions.

The control of the end feed is the same as shown in FIG. 11, and will not be separately illustrated. The corresponding elements are:

| Infeed: | End feed |
|---|---|
| Hand wheel 84 | Hand wheel 84'. |
| Selsyn 82 | Not shown. |
| Selsyn 85 | Not shown. |
| Selsyn 52 | Selsyn 70. |
| Clutch 53 | Clutch 69. |
| Clutch 49 | Clutch 74. |
| Motor 51 | Motor 75. |
| Motor 47 | Motor 64. |

Figure 13:
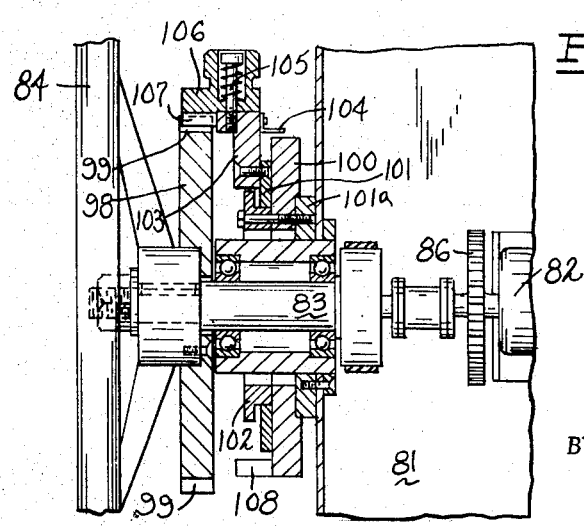
FIG. 13 is a view in half-section of apparatus for setting a predetermined limit on rotation of the control handwheel of FIG. 4.

The hand wheel control may be provided with a detent mechanism to limit rotation of the hand wheel and to provide a position memory. Mounted to the hub of hand wheel 84 for rotation is a gear-like member 98 having a plurality of equally spaced detents 99 about its periphery. Mounted to the housing of control box 81 is an index ring 100 and adapter 101a therefor. A graduated scale, not shown, is defined on the periphery of index ring 100. A ring 101 is rotatable with respect to index ring 100 on a retainer 102. Carried on ring 101 is an arm 103 which has a pointer 104 thereon adapted to cooperate with the scale on ring 100. Mounted to arm 103 by means of bolt and biasing spring assembly 105 is a locking member 106, having a male detent 107 adapted to fit in detents 99. In the position shown in FIG. 13, ring 101 is locked to hand wheel 84 and will rotate therewith. With this arrangement, the operator may observe the relation of pointer 104 to the graduated scale to control the infeed. One or more stops 108 may be provided, either adjustably or fixedly, on index ring 100 and be utilized as position memories. Assume the grinding wheel is in a grinding position and the operator wishes to back-off the grinding wheel and return it to the same position. The operator may lift member 106 against the spring bias and rotate it or hold it out of engagement with detents 99. Then ring 101 is rotated until member 106 abuts a stop 108, and member 106 is re-engaged with a detent 99. The operator may then rotate hand wheel 84 to back-off the grinding wheel.

Subsequently, when it is desired to return the grinding wheel to its original position, hand wheel 84 is rotated until member 106 again engages the stop and the described control system returns the grinding wheel to its original position.

With the described arrangement, the operator may assume an operating position directly adjacent the grinding wheel for grinding small dimensions, journals, slots, fillets, shoulders, etc. and is in a ready position for gaging and measuring with fine feed control of the grinding wheel readily available.

It may thus be seen that the objects of the invention set forth as well as those made apparent from the preceding description are efficiently attained. While a preferred embodiment of the invention has been set forth for purposes of disclosure, other embodiments of the invention as well as modifications to the disclosed embodiments may occur to those skilled in the art which do not depart from the spirit and scope of the invention. It is, therefore, intended in the appended claims to cover all embodiments of the invention, as well as modifications to the disclosed embodiments of the invention which do not depart from the spirit and scope of the invention.

What is claimed is:

1. Roll grinding apparatus comprising a bed, said bed having a wall, a grinding wheel carriage constructed and arranged to move along the length of said bed on one side thereof, a grinding wheel platform on said carriage, means for moving said grinding wheel platform toward and away from said wall, and control means mounted for movement along the length of said bed on the side thereof opposite said grinding wheel, said control means being movable along said wall independent of movement of said platform, said control means including means for predetermining the degree of movement of said platform toward and away from said wall and operating said means for moving.

2. The apparatus of claim 1 wherein said bed includes a front wall and said control means is slidably mounted to said front wall.

3. Roll grinding apparatus comprising a bed, a grinding wheel carriage constructed and arranged to move along the length of said bed, means for moving said grinding wheel carriage, and means for controlling said means for moving to move said carriage along said bed, said means for controlling being slidably mounted to said bed for movement along the length thereof independent of movement of said carriage along the bed.

4. The apparatus of claim 3 wherein said bed includes a front wall and said control means is slidably mounted to said front wall.

5. Roll grinding apparatus comprising a bed including means for rotatably supporting a roll to be ground, a grinding wheel carriage movable along one side of said bed, a grinding wheel on said carriage movable toward and away from a roll on said roll support means, first means for moving said carriage, second means for moving said grinding wheel, control means movable along the length of said bed on the opposite side thereof from said carriage, said control means being movable on said bed independent of movement of said carriage and said grinding wheel and including first control means for operating said first means for moving and second control means for operating said second means for moving.

6. The apparatus of claim 1 wherein said control means includes a manual adjustment for predetermining the degree of movement of the platform, means providing a reference signal, a first device coupled to said manual adjustment and adapted to receive said reference signal and generate a first signal having a phase indicative of the predetermined degree of movement of the platform by said manual adjustment, a second device adapted to receive said first signal and produce a second signal having a phase indicative of the difference in the actual position of the object and the position commanded by said second device, detecting means for comparing said second signal and said reference signal and producing an error signal indicative of the phase difference therebetween, means for applying said error signal to said means for moving to cause said means for moving to move said platform to said predetermined position, and means responsive to said first device for maintaining the second signal in a predetermined phase relation with said first signal when said system is not operative to position said platform.

7. The apparatus of claim 6 wherein said means for moving is a motor, said first device is a selsyn adapted to have its rotor positioned by said manual adjustment to predetermine a position of the platform and generate a signal having a phase indicative of said position, said second device is a selsyn arranged to normally have its rotor displaced ninety electrical degrees from the rotor of said first selsyn, said detecting means is a phase discriminator arranged to detect the phase difference between a reference voltage and the rotor voltage of said second selsyn and generate an error signal to control said motor, and said responsive means comprises a third selsyn having its rotor geared to the rotor of said first selsyn and its field connected to the field of said second selsyn.

8. The apparatus of claim 1 wherein said control means comprises manual means for predetermining the degree of movement of said platform, said means for moving is a motor, means responsive to said manual means for generating a signal indicative of the desired degree of movement, a discriminator for detecting the difference in phase between a reference signal and another signal and producing an error signal indicative of the phase difference therebetween, means for applying said error signal to said motor, a first selsyn adapted to receive said reference signal and generate a first signal having a phase indicative of a predetermined position of the rotor of said first selsyn, a second selsyn responsive to receive said first signal and produce said another signal having a phase indicative of the position of the rotor of said second selsyn, means for applying said reference signal and said another signal to said discriminator, and a third selsyn having its rotor geared to the rotor of said first selsyn and connected to said second selsyn to maintain the rotor of said second selsyn in predetermined relation with the rotor of said first selsyn when said control means is not operative to position said platform.

9. The apparatus of claim 8 wherein said manual means is coupled to the rotor of said first selsyn for producing rotation thereof.

10. The apparatus of claim 9 further including means for predetermining the rotation of said manual means.

11. The apparatus of claim 8 further including means for memorizing the position of said manual means.

12. The apparatus of claim 3 wherein said control means includes a manual adjustment for predetermining the degree of movement of the carriage, means providing a reference signal, a first device coupled to said manual adjustment and adapted to receive said reference signal and generate a first signal having a phase indicative of the predetermined degree of movement of the carriage by said manual adjustment, a second device adapted to receive said first signal and produce a second signal having a phase indicative of the difference in the actual position of the object and the position commanded by said second device, detecting means for comparing said second signal and said reference signal and producing an error signal indicative of the phase difference therebetween, means for applying said error signal to said means for moving to cause said means for moving to move said carriage to said predetermined position, and means responsive to said first device for maintaining the second signal in a predetermined phase relation with said first signal when said system is not operative to position said carriage.

13. The apparatus of claim 12 wherein said means for moving is a motor, said first device is a selsyn adapted to have its rotor positioned by said manual adjustment to predetermine a position of the carriage and generate a signal having a phase indicative of said position, said second device is a selsyn arranged to normally have its rotor displaced ninety electrical degrees from the rotor of said first selsyn, said detecting means is a phase discriminator arranged to detect the phase difference between a reference voltage and the rotor voltage of said second selsyn and generate an error signal to control said motor, and said responsive means comprises a third selsyn having its rotor geared to the rotor of said first selsyn and its field connected to the field of said second selsyn.

14. The apparatus of claim 3 wherein said control means comprises manual means for predetermining the degree of movement of said carriage, said means for moving is a motor, means responsive to said manual means for generating a signal indicative of the desired degree of movement, a discriminator for detecting the difference in phase between a reference signal and another signal and producing an error signal indicative of the phase difference therebetween, means for applying said error signal to said motor, a first selsyn adapted to receive said reference signal and generate a first signal having a phase indicative of a predetermined position of the rotor of said first selsyn, a second selsyn responsive to receive said first signal and produce said another signal having a phase indicative of the position of the rotor of said second selsyn, means for applying said reference signal and said another signal to said discriminator, and a third selsyn having its rotor geared to the rotor of said first selsyn and connected to said second selsyn to maintain the rotor of said second selsyn in predetermined relation with the rotor of said first selsyn when said control means is not operative to position said carriage.

15. The apparatus of claim 14 wherein said manual means is coupled to the rotor of said first selsyn for producing rotation thereof.

16. The apparatus of claim 15 further including means for predetermining the rotation of said manual means.

17. The apparatus of claim 14 further including means for memorizing the position of said manual means.

References Cited

UNITED STATES PATENTS 1,968,550   7/1934   Barnes _____ 51—49

LESTER M. SWINGLE, Primary Examiner

U.S. Cl. X.R.

51—49